United States Patent [19]

Sahm et al.

[11] Patent Number: 5,758,399
[45] Date of Patent: Jun. 2, 1998

[54] TOOL TURRET WITH TORQUE OVERLOAD PROTECTION

[75] Inventors: Detlef Dieter Sahm, Reichenbach; Alfred E. Muller; Peter Quass, both of Metzingen, all of Germany

[73] Assignee: Sauter Feinmechanik GmbH, Metzingen, Germany

[21] Appl. No.: 638,187

[22] Filed: Apr. 26, 1996

[30] Foreign Application Priority Data

May 9, 1995 [DE] Germany ............... 195 16 984.0

[51] Int. Cl.$^6$ ................. B23Q 17/00; B23B 29/32
[52] U.S. Cl. ............ 29/48.5 A; 29/39; 74/813 L; 74/826; 82/159
[58] Field of Search ............ 29/40, 48.5 R, 29/48.5 A, 39, 36; 408/35; 74/813 L; 409/134

[56] References Cited

U.S. PATENT DOCUMENTS

| | | | |
|---|---|---|---|
| 4,893,532 | 1/1990 | Walburn et al. | 409/134 X |
| 4,972,744 | 11/1990 | Sauter et al. | 29/48.5 R X |
| 4,989,303 | 2/1991 | Sauter et al. | 29/48.5 A |
| 4,991,474 | 2/1991 | Thumm et al. | 74/813 L X |
| 5,168,614 | 12/1992 | Thumm | 408/35 X |
| 5,187,847 | 2/1993 | Thumm et al. | 29/48.5 A |

FOREIGN PATENT DOCUMENTS 4018543   8/1991   Germany.

*Primary Examiner*—William R. Briggs
*Attorney, Agent, or Firm*—Roylance,Abrams,Berdo & Goodman L.L.P.

[57] ABSTRACT

A tool turret has a turret housing and a hollow supporting column. A head is provided at one end of the supporting column. The other end of the supporting column is connected with the turret housing. A tool face is mounted rotatably relative to the head and is lockable with this head. The tool face has at least one recess for a tool. A torque overload protection arrangement is provided between the hollow supporting column and the head and/or between the hollow supporting column and the turret housing.

7 Claims, 2 Drawing Sheets

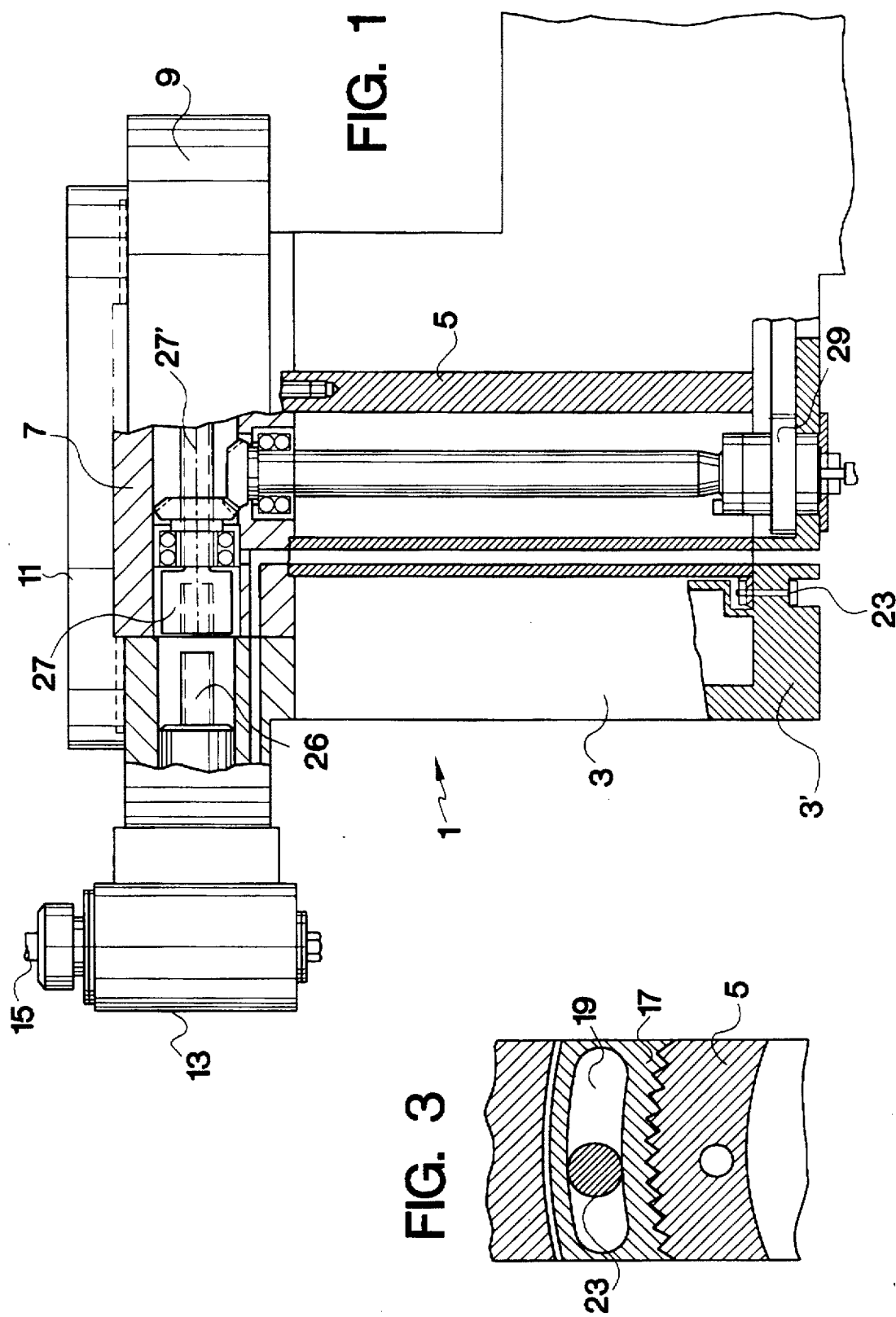

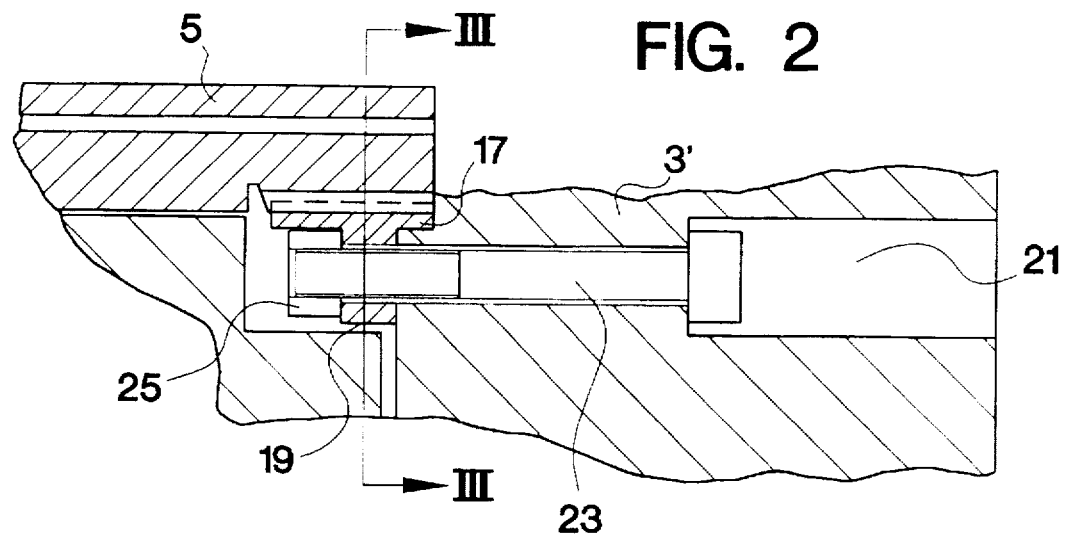
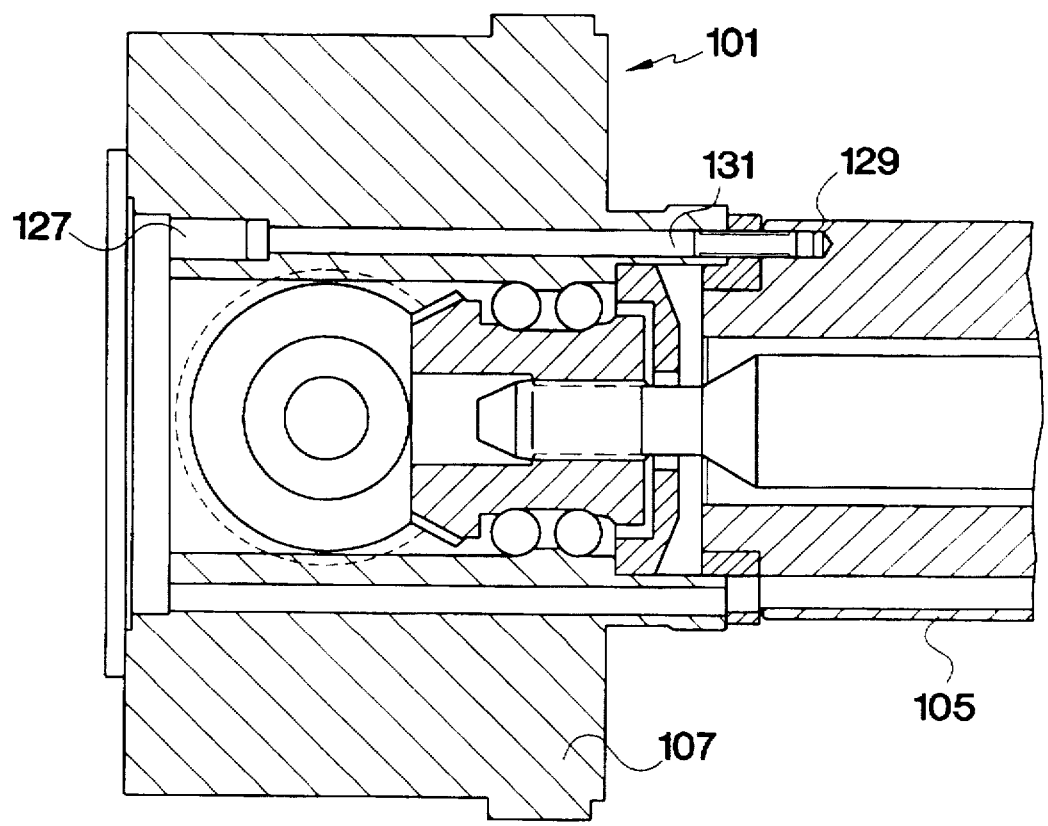

5,758,399

1

TOOL TURRET WITH TORQUE OVERLOAD PROTECTION

FIELD OF THE INVENTION

The present invention relates to a tool turret having a turret housing, a hollow supporting column attached at one of its ends to the turret housing, and a head at the other end of the support column. A tool face is rotatably mounted on the head, is lockable in selectable angular positions with the head and can support a tool.

SUMMARY OF THE INVENTION

A tool turret is disclosed in German Patent No. 40 18 543 C1. A rotary tool, for example a milling cutter or a drill or the like, can be mounted on a tool face of a tool turret. By means of gearing in the turret head encircled by the tool face, as well as a drive shaft in the hollow support column, the tool is placed in geared connection with a drive motor mounted on the turret housing. Collision of the tool with a workpiece or a machine part can lead to damage of the tool turret. Damage occurs because no flexible or resilient means are incorporated in the design for absorbing the stress of impact caused by the collision.

SUMMARY OF THE INVENTION

Objects of the invention are to provide an improved tool turret which has a torque overload protection or safety arrangement between the hollow supporting column and the head and/or between the hollow supporting column and the turret housing.

The foregoing objects are basically obtained by a tool turret comprising a turret housing, a hollow supporting column having a first end connected to the turret housing, and a head mounted at a second end of the hollow supporting column. A tool face is rotatably mounted on the head, is lockable in angular positions relative to the head, and has at least one holder means for receiving a tool. Torque overload protection means releasably couples the hollow supporting column to one of the head and the turret housing against relative rotation, and releases the hollow supporting column and the one of the head and the turret housing for rotation in response to a predetermined torque.

By forming the tool turret in this manner, the hollow supporting column no longer only connects the head rigidly with the housing. The limit value at which the torque overload protection arrangement reacts can be set so that in case of collision, none of the relevant parts of the tool turret are subject to unduly high stress. Thus, damage to the turret can be reliably avoided.

A simple and low cost execution of torque overload protection is a bolt-shearing protection arrangement. The torque is carried by one or more bolts, for example a screw bolt, which connect the head with the hollow supporting column or the hollow supporting column with the housing. These bolts are of such dimensions that they are sheared off when the limit value of the stress or load is reached. After removal of the broken parts and placement of new bolts, the tool turret is again ready for operation.

Torque overload protection can also be embodied as a friction clutch protection arrangement. In this case, the collision force is at least partially nullified by the friction between two parts. With repeated operation of the tool turret, these parts need only be realigned, without requiring any removal of broken parts.

It is also possible to combine both types of protection systems, whereby the friction clutch protection arrangement

2 is set so that it reacts before the bolt-shearing protection arrangement. The bolt-shearing arrangement is brought into operation only when the energy or force applied by the friction clutch arrangement does not suffice.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 1 is a side elevational view, partially in section, of a tool turret according to a first embodiment of the present invention;

FIG. 2 is a partial, enlarged side elevational view in section of the tool turret of FIG. 1;

FIG. 3 is a partial top plan view in section taken along line III—III of FIG. 2; and FIG. 4 is a partial side elevational view in section of a tool turret according to a second embodiment of the present invention.

DETAILED DESCRIPTION OF THE INVENTION

The first embodiment illustrated in FIGS. 1 and 2 includes a tool turret, indicated in its entirety as 1. The tool turret comprises a torque overload protection or safety arrangement located between its turret housing 3 and a hollow supporting column 5, mounted in turret housing 3.

A head 7 at one end of cylindrically configured hollow supporting column 5 is concentric or coaxial with column 5, and extends axially beyond turret housing 3. In the first embodiment, hollow supporting column 5 and head 7 are connected by screws. Head 7 is introduced or received fully into a recess in the center of tool face 9, which recess is adapted to the outside dimensions of head 7. Tool face 9 is mounted to rotate relative to head 7, and carries a cover 11 on its surface remote from turret housing 3.

Around its periphery, tool face 9 has at least one holder for a spindle head 13 carrying a rotating tool 15. Several such holders are provided in the first embodiment. However, for simplicity, the drawing illustrates only one holder.

In at least one work setting, a driving or thrusting journal 26 extending from spindle head 13 can be locked together or engaged with a clutch spindle or shaft 27 mounted on head 7. Clutch spindle or shaft 27 is mounted for rotation about and for axial sliding along its longitudinal axis 27' in head 7. Clutch spindle or shaft 27 is driven by means of a drive transmission line 29.

On its end opposite head 7, hollow supporting column 5 is connected with turret housing 3 by means of a torque overload protection arrangement, described in greater detail hereinafter in connection with FIG. 2. Hollow supporting column 5 has an annular flange 17 extending radially for a distance from hollow supporting column 5 where it is aligned along its periphery. Flange 17 is connected nonrotatably with hollow supporting column 5. The two interfaces or axially facing contact surfaces of flange 17 lie perpendicular to the axis of hollow supporting column 5. The flange interface, nearer the end of hollow supporting column 5, engages lamina-like in a plane on a flat end plate 3' of turret housing 3. Longitudinal openings 19 each having the form of a slot along a circle concentrical to column 5 are provided in flange 17, are arranged circumferentially about the flange periphery, and pass through flange 17 perpendicular to the contact surfaces between it and end plate 3'. The flange is coaxial or longitudinally aligned concentric with hollow supporting column 5.

A through-hole 21 in end plate 3' is aligned with the middle of each longitudinal opening 19, and is likewise perpendicular to the contact surfaces of flange 17 and end plate 3'. Each through-hole 21 extends from the outside of turret housing 3 to the contact surfaces of flange 17 and end plate 3'. Additionally, each through-hole 21 receives a screw 23. Each screw 23 is of a length permitting each screw to project through a through-hole 21 and a longitudinal opening 19 and to project to a screw end some distance beyond the side of flange 17 remote from end plate 3'. A nut 25 is provided at this end of screw 23. By means of nut 25, screw 23, flange 17 and end plate 3' are held together by tension. The tension is determined so that with the stresses exerted during an orderly and methodical or normal operation of the tool turret do not cause flange 17 to move relative to end plate 3', particularly in a direction for each screw 23 to reach its end position from the middle position of the associated longitudinal opening 19. Therefore, hollow supporting column 5 is normally nonrotatably connected with turret housing 3.

Use of tool turret 1 which is abnormal or is not orderly and methodical can be caused by a collision of tool 15 with the workpiece to be worked upon or with a part of the machine. When the driving or thrusting journal 26 of spindle head 13 is engaged with clutch spindle 27, a torque causing rotation of head 7 is created by a collision. Since head 7 is screwed or fixed together with hollow supporting column 5, the torque thrust or impact works on these parts. The torque overload protection then operates variously according to the magnitude of the torque.

In the case of a torque existing below the reaction value, the friction torque between flange 17 and end plate 3' is greater than the effective torque. In the case of a torque exceeding the reaction value and surmounting of the friction force, flange 17 begins to be moved relative to end plate 3', i.e., rotate around the longitudinal axis of hollow supporting column 5. The collision force is broken up or relieved as a result of friction between flange 17 and end plate 3' and between flange 17 and nut 25. The torque overload protection arrangement in this case works as a friction clutch protection arrangement.

In case of a still greater torque, the already described movement of flange 17 relative to end plate 31 occurs first. If screw 23 reaches the end or edge of longitudinal opening 19, screw 23 is sheared off if the remaining force is still sufficient. The torque overload protection in that case also operates as a bolt-shearing protection arrangement.

A second exemplary embodiment of FIG. 3 shows a tool turret 101 with a torque overload protection arrangement between its hollow supporting column 105 and the head 107 connected with the column. The individual features of the second exemplary embodiment are not described in greater detail, since they coincide with those of the first embodiment or with those of conventional tool turrets, such as the tool turret disclosed in German Patent No. 40 18 543 C1, the subject matter of which is hereby incorporated by reference.

Head 107 engages with one interface or contact surface thereof on that interface or contact surface of hollow supporting column 105 remote from the turret housing (not shown in the drawing). The longitudinal axis of head 107 is thus aligned with the longitudinal axis of hollow supporting column 105. Between the two interface surfaces of head 107, at least two boreholes 127 extend parallel to the head longitudinal axis. Only one borehole is shown in the drawing.

Embodied as a step-borehole, each borehole 127 is provided a blind bore 129 in the wall of hollow supporting column 105. The blind bore incorporates an internal thread. From the surface of head 107 remote from hollow supporting column 105, screw 131 is introduced into bore 127 and screwed into the thread of blind bore 129. The screw head engages the step formed at the transition between the various diameters of borehole 127. During normal operation, hollow supporting column 105 and head 107 are held securely together by screws 131 and are nonrotatably relative to one another.

If a collision occurs, however, as described in the first embodiment, a torque is transferred to head 107. If this torque exceeds a predetermined limit value, screws 131 are broken, without other parts of the tool turret being damaged. The torque overload protection obtained by this arrangement is carried out the same as a bolt-shearing protection.

The invention is not limited to providing a torque overload protection only at one end of the hollow supporting column. Torque overload protection arrangements can be constructed at both ends. Likewise, each torque overload protection arrangement can be configured as either a bolt-shearing protection or a friction clutch protection or as a combination of the two.

Furthermore the invention is not limited to the use of one of the already described torque overload protection arrangements. Any torque overload protection arrangement which limits the transferrable torque can be used.

While various embodiments have been chosen to illustrate the invention, it will be understood by those skilled in the art that various changes and modifications can be made therein without departing from the scope of the invention as defined in the appended claims.

What is claimed is:

1. A tool turret, comprising:

a tool turret housing;

a hollow supporting column having first and second ends, said first end being connected to said turret housing;

a head mounted at said second end of said hollow supporting column;

a tool face rotatably mounted on said head and lockable in angular positions relative to said head, said tool face having at least one holder means for receiving a tool; and torque overload protection means for releasably coupling said hollow supporting column to one of said head and said turret housing against relative rotation and for releasing said head for rotation in response to a predetermined torque.

2. A tool turret according to claim 1 wherein said torque overload protection means comprises bolt shearing means.

3. A tool turret according to claim 2 wherein said torque overload protection means comprises a friction clutch.

4. A tool turret according to claim 1 wherein said torque overload protection means comprises a friction clutch.

5. A tool turret according to claim 1 wherein said torque overload protection means is between said hollow supporting column and said turret housing.

6. A tool turret according to claim 1 wherein said torque overload protection means is between said hollow supporting column and said head.

7. A tool turret according to claim 1 wherein said tool turret, said hollow supporting column and said head are fixed in position relative to one another by said torque overload protection means in response to torques less than said predetermined torque.

* * * * *